June 24, 1930. G. B. CROUSE ET AL 1,767,052

VOLTAGE REGULATOR

Original Filed Sept. 8, 1926

Inventors:
George B. Crouse,
Jacob L. Jatlow,
By Byrnes Townsend & Brickenstein,
Attorneys Patented June 24, 1930

1,767,052

UNITED STATES PATENT OFFICE

GEORGE B. CROUSE, OF WOODCLIFF, AND JACOB L. JATLOW, OF ELIZABETH, NEW JERSEY, ASSIGNORS TO CONNER CROUSE CORPORATION, OF NEW YORK, N. Y., A CORPORATION OF NEW YORK

VOLTAGE REGULATOR

Original application filed September 8, 1926, Serial No. 134,249. Divided and this application filed September 15, 1926. Serial No. 135,694.

This invention relates to voltage regulators and more particularly to automatic regulators for controlling the voltage impressed upon a load line under variations in an electrical condition which tends to alter the voltage across the load.

The invention is particularly useful in effecting a control of the output voltage of an electrical converter. The control is usually designed to maintain the output voltage constant, but this is not essential as the design may be such that the voltage across the load varies in the same sense or in a sense opposite to that which would normally accompany a change in the critical electrical condition upon which the regulation is based. In supplying current to a load from a source of energy and through an electrical converter, the particular electrical condition which determines the regulation may be the input voltage, the voltage across the load itself, or the value of the load.

In accordance with this invention, the desired regulation is effected by passing current from the source or from the load line through a regulating resistance, and controlling the effect of the resistance upon that current by simultaneously subjecting the resistance to the influence of an additional current, which additional current may pass through the regulating resistance or through a separate resistance thermally coupled thereto. The regulating resistance may be formed of material having a negligible or a high temperature-resistance coefficient, and in the preferred embodiments of the invention the resistance is free from mechanically movable parts and electric make-and-break contacts. When the resistance is formed of material having a negligible temperature-resistance coefficient, it is of the type commonly designated a "fixed resistance." Since this term would be misleading when applied to a resistance whose value varies with temperature changes, the term "static resistance" is employed in the following specification and claims to designate a resistance which is free from moving parts or make-and-break contacts, but which may or may not be formed of such material that its effective value varies with temperature changes.

This application is a division of our copending application, Serial Number 134,249, filed Sept. 8, 1926, which application includes a description of and generic claims to the present invention. The claims of this application are restricted to apparatus which are excluded by the terms of the specific claims of our copending application.

An object of the invention is to provide apparatus for controlling the operation of a dynamo electric machine by including a resistance in the circuit thereof, and controlling the effect of that resistance upon the performance of the machine by subjecting the resistance to the influence of a regulating current which is passed through the resistance, or through a second resistance thermally coupled thereto. A further object is to provide apparatus for regulating the magnitude and/or the frequency of the output voltage of a motor-generator by passing a regulating current through a static resistance which is included in the circuits of the motor-generator. More specifically an object is to provide apparatus for regulating the output voltage of a motor-generator by including a static resistance in the circuit of one of the field windings, and controlling the effect of the resistance in such field circuit by passing an additional current through the static resistance.

These and other objects of the invention will be apparent from the following specification when taken with the accompanying drawings, in which.

Figure 1:
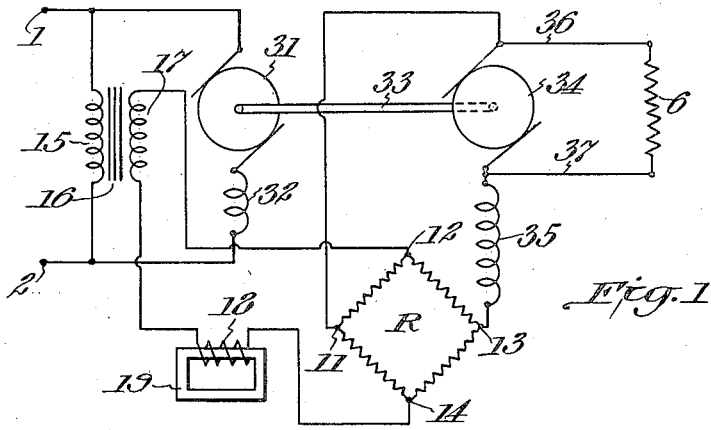
Fig. 1 is a circuit diagram of apparatus in which the output voltage is controlled from variations in the source voltage.

The circuit diagram of Fig. 1 illustrates a direct current generator operated by an alternating current motor. The alternating current input terminals 1 and 2 are shown as feeding power to a series type motor having a commutator 31 and a series field 32. This motor is joined by the shaft 33 to a direct current generator having a commutator 34 and a self-excited shunt field 35. The load 6 is joined to the output of the motor by means of the wires 36 and 37. Inserted in the shunt field 35 of the generator is the resistance bridge R comprising the four arms which are serially connected in a closed circuit at the junction points 11, 12, 13 and 14.

The regulating current for controlling the effective value of the resistance bridge R is withdrawn from the source by a transformer having a primary winding 15, an iron core 16 and a secondary winding 17. One terminal of the secondary 17 is joined to the junction point 12 of the bridge, the other terminal being connected to the junction point 14 through the coil 18 on its iron core 19.

The elements of the system should be so proportioned that when the alternating current potential between the input terminals 1 and 2 is at its lowest operating value, the potential delivered by the direct current generator to the load 6 will be at its selected value.

An increase of input potential between the terminals 1 and 2 will result in an increase in the voltage across the winding 17, and therefore an increase of alternating current flowing through the regulating circuit which includes the bridge. This increase in alternating current will cause an increase of the resistance interposed in the exciting field 35 and therefore a reduction of voltage across the terminals 36 and 37 from this cause. At the same time the increase of input potential has caused an increase of speed of the alternating current motor. By properly proportioning the various elements of the circuit, and more particularly the coil 18 and its core 19 and the characteristics of the bridge, the two effects may be made to substantially cancel each other so that a uniform direct current potential is maintained across the load 6 under conditions of varying input potential.

While the use of the coil 18 results in an economy of power and permits greater flexibility in design, it is not essential to the operation of the system. By increasing the proportion of alternating current flowing through the bridge to that of the direct current, regulation may be secured in the same manner as above.

Figure 2:
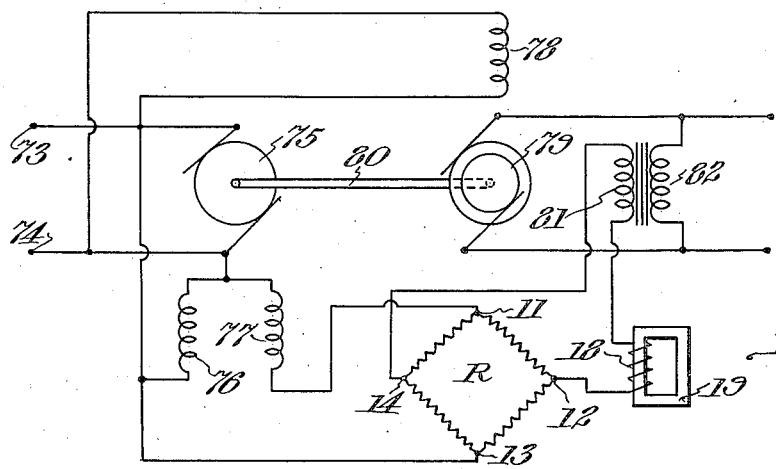
Fig. 2 is a circuit diagram of apparatus in which the frequency of the alternating current output voltage is controlled.

When the motor-generator output is alternating current, the regulation may relate to the frequency and/or the magnitude of the output voltage. The circuit diagram of Fig. 2 illustrates a frequency control for an alternator which is coupled to a direct current motor. The numerals 73, 74 indicate a direct current line across which the motor armature 75 and shunt field winding 76 are connected. A differential field winding 77 is also supplied from the source through the temperature-variant resistance bridge R. The armature 79 of the generator is driven from motor armature 75 by a shaft 80 or the like. The regulating circuit for controlling the effective value of the static resistance includes the inductance 18 on a closed iron core 19 and the secondary 81 of an iron core transformer, the primary 82 of the transformer being connected across the alternating current output or load line. The regulating circuit and the differential winding are connected across the conjugate pairs of junction points 12, 14 and 11, 13, respectively.

A change in the source voltage will cause a change in the current flowing in the generator field 78, which change will be reflected in the voltage of the alternating current output and also in the output of the secondary winding 81 of the regulating transformer. This change in regulating current will result in a large change in the resistance between points 11 and 13 of the resistance bridge R, and consequently in the current flowing in the differential field winding 77. As a general rule, the current flowing in the differential winding is controlled in such manner that the total motor field strength so varies, in relation to the voltage applied to the motor armature, that a constant motor speed and consequently a constant output frequency will be maintained. If, for example, the voltage across the source lines 73, 74 rises, the motor would ordinarily increase in speed. The increase in source voltage results in a stronger generator field and consequently an increased alternating current voltage. The increased output voltage operates through the regulating transformer and saturation choke coil 18 to increase the regulating current flowing through the static resistance. The resistance of the bridge R is thus increased and the current flowing in the differential winding 77 is thereby reduced. The motor field strength is therefore increased and consequently the motor speed tends to fall. By an appropriate design of the elements, the increase in motor field strength may be just sufficient to counteract the tendency toward increased speed which resulted from the increase of source voltage.

Figure 3:
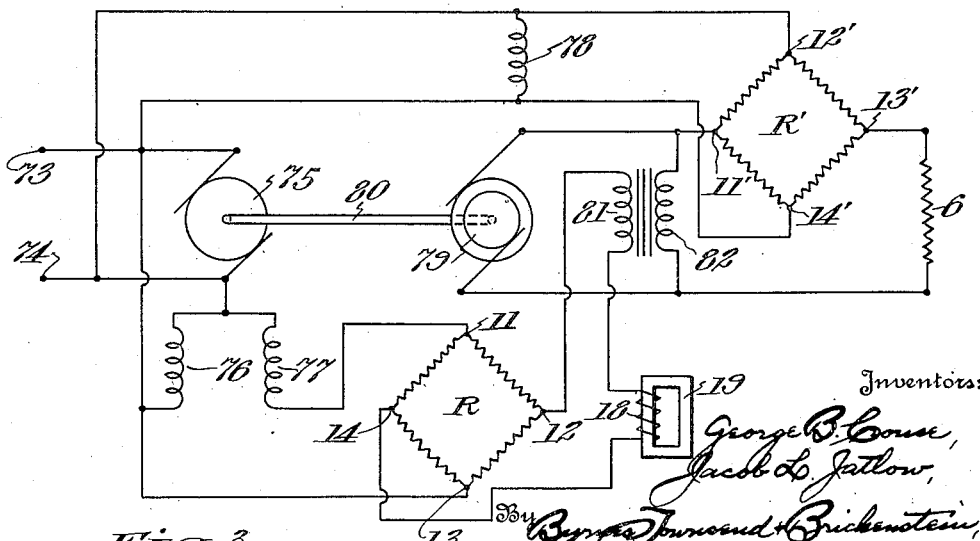
Fig. 3 is a circuit diagram of apparatus in which both the magnitude and the frequency of the alternating current output voltage is controlled.

The motor-generator circuit of Fig. 3 shows this frequency control system combined with an output voltage control. The frequency control elements may be identical with the various elements of Fig. 2 and the same numerals are therefore applied to corresponding elements of these circuits. The control of the alternating current voltage impressed upon the load line is effected by a second temperature-variant resistance bridge R' which is included in the load line of the alternator beyond the transformer primary 82. The load line is connected to the bridge at conjugate junction points 11' and 13', and the regulating current is supplied by connecting the source across the other pair of junction points 12' and 14'. If the source voltage increases, the frequency regulation is effected in the manner described above, and the increased source voltage causes more direct current to pass through bridge R' to thereby increase the resistance offered to the alternating current. By appropriate design, the entire increase in alternating current output voltage may be absorbed in the bridge R', consequently a substantially constant output voltage will be maintained under conditions of varying supply voltage.

The frequency control system will operate as a motor speed control when the motor unit develops power for the operation of machinery or apparatus additional to the generator unit. The generator unit may be of such relatively small size that its entire output is employed in the regulating circuit of the resistance bridge.

Attention is directed to the fact that an automatic regulation of voltage as to magnitude and/or as to frequency may be obtained without the use of mechanically movable parts or electric make-and-break devices. It will be obvious that while certain elements may be moved for effecting a preliminary or occasional adjustment of a particular system, the actual regulation for variations in a critical electrical condition will take place automatically when the parts are suitably designed to effect that result.

It is to be understood however that while the invention may be embodied in an automatic regulator, manually operated switches or other devices may be used in connection with or as substitutes for the elements which effect the automatic regulation. So far as applicants are aware, it is broadly new to control the operation of dynamo-electric machinery by introducing a resistance as an element of the field winding circuit, controlling the effect of that resistance upon the flow of field current by simultaneously subjecting the resistance to the heating effect of a regulating current which is varied in accordance with the desired nature of the regulation and also passing the regulating current through static means for causing small variations in the condition to be regulated to cause relatively large variations in the effect of the regulating current upon the resistance. When the resistance is of the temperature-variant type the regulating current may be passed through the regulating resistance or through a separate resistance thermally coupled thereto.

The several circuits described herein indicate the manner in which the invention may be practiced, but it is apparent that the invention is not limited to these illustrative circuits.

We claim:

1. A frequency regulator for a motor-generator comprising a motor having a temperature-variant resistance in the field winding circuit thereof, a generator, means for subjecting said resistance to the heating effect of a current whose magnitude varies as a function of the output voltage, and a coil associated with the means and wound upon an iron core substantially at the point of saturation.

2. A motor-generator comprising a direct current motor, an alternating current generator having a direct current field energized in parallel with said motor, a temperature-variant resistance in the field winding circuit of said motor for controlling the flow of current therethrough, a regulating circuit coupled to said generator for supplying a regulating current to said resistance, and a coil in the regulating circuit wound upon an iron core substantially at the point of saturation.

3. A motor speed regulator comprising a motor having a field winding, a static resistance in the circuit of said field winding for controlling the flow of current therethrough, an additional circuit for subjecting said static resistance to the influence of a regulating current for controlling the effective value thereof, and a coil in the additional circuit wound upon an iron core substantially at the point of saturation.

4. A motor-generator comprising a direct current motor, an alternating current generator having a direct current field energized in parallel with said motor, a temperature-variant resistance in the field winding circuit of said motor for controlling the flow of current therethrough, a transformer having its primary winding connected across the generator and its secondary winding connected across the resistance and an inductance with a magnetic core in series with the secondary winding and the resistance.

In witness whereof, we affix our signatures.

GEORGE B. CROUSE.
JACOB L. JATLOW.